2,870,121

PENTAERYTHRITOL - ACROLEIN REACTION PRODUCTS AND METHOD OF PRODUCING SAME

William M. Kraft, Verona, N. J., assignor to Heyden Newport Chemical Corporation, a corporation of Delaware No Drawing. Application December 12, 1955
Serial No. 552,300

7 Claims. (Cl. 260—67)

The present invention relates to the production of pentaerythritol-acrolein reaction products and more particularly relates to improvements in the production of allylidene-pentaerythritol in such a manner as to produce a stable product which can be subsequently cured to form a clear, light colored, cloud-free resin. The present invention is concerned also with the novel, stable product produced by the present process.

Synthetic resins can be prepared from pentaerythritol and acrolein. Resinification takes place in two stages. In the first stage, there is formed what is frequently referred to as a "prepolymer." The prepolymer is formed as a result of acetalization of the pentaerythritol by acrolein in the presence of an acidic condensation catalyst. This prepolymer is generally considered to be allylidene-pentaerythritol which is a mixture of mono-allylidene-pentaerythritol and diallylidene-pentaerythritol. Acetalization apparently takes place in accordance with the following two reactions to form an aqueous solution of allylidene-pentaerythritol.

(1)
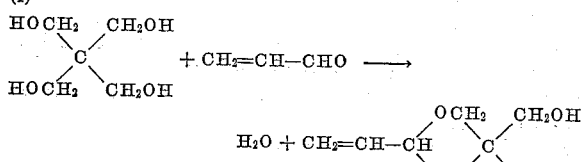

(2)
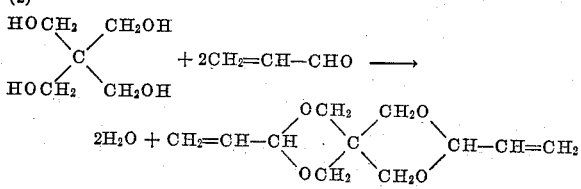

In the second stage and after dehydration to remove the water formed during the first stage and any free acrolein which may be present, the diallylidene-pentaerythritol and monoallylidene-pentaerythritol react in the presence of an acidic catalyst with monoallylidene-pentaerythritol and pentaerythritol, if any unreacted pentaerythritol is present, to form a clear, hard resin. While the reactions taking place during the second or curing stage are not fully understood, polymerization with extensive cross-linking occurs. In order to cure properly, the allylidene-pentaerythritol product of the first stage should contain some monoallylidene-pentaerythritol. Thus, the maximum amount of acrolein which can be reacted with the pentaerythritol in the first stage is somewhat less than 2 moles per mole of pentaerythritol. The preferred minimal amount of acrolein is one mole per mole of pentaerythritol. This minimal amount of acrolein will produce a product containing monoallylidene-pentaerythritol and diallylidene-pentaerythritol plus some unreacted pentaerythritol. In general, optimum results are obtained by reacting 3.5–5.0 moles of acrolein per 3 moles of pentaerythritol. However, it is to be understood that about 2.75–6 moles of acrolein for each 3 moles of pentaerythritol constitutes the extreme range. The acidic catalyst which promotes curing may be the same as the catalyst used during the first stage. While p-toluene sulfonic acid is a preferred catalyst, other acidic condensation catalysts, such as oxalic acid, phosphorous acid, boron trifluoride or the like, may be used. The properties of the resin may be modified by incorporating other compounds with the allylidene-pentaerythritol prior to curing.

At times it is desirable to store or hold the allylidene-pentaerythritol produced during the first stage. The allylidene-pentaerythritol which contains acidic condensation catalyst is very unstable and cannot be stored or held as the acidic catalyst promotes curing and the formation of undesirable by-products. It is very difficult, if not impossible, to separate the allylidene-pentaerythritol from the acidic catalyst by known means. It has been proposed that the catalyst be neutralized by the addition of sodium hydroxide or sodium acetate. While neutralization of the catalyst in this manner does produce a stable product, the salts tend to contaminate the product and when cured, the resin is cloudy or hazy. This cloudiness is, of course, undesirable. In addition, considerable care must be exercised in such a neutralization step to avoid the addition of an excess of basic material as such an excess will cause the acrolein residue to polymerize and form insoluble compounds.

I have discovered a novel means of neutralizing the catalyst in the reaction product of the first stage. Resins subsequently produced are not cloudy and are very light in color. I have found that the acidic aqueous reaction product of the first stage can be neutralized with choline or benzyl trimethyl ammonium hydroxide, and thereafter the neutralized solution can be dehydrated to attain a stable neutralized product containing the reaction product of the acidic catalyst and the neutralizing agent. Not only is the neutralization reaction product soluble in the allylidene-pentaerythritol but it appears to be soluble in the cured resin. The reaction product not only does not precipitate and produce any cloudiness in the cured resin, but surprisingly it has been found that the cured resin is very light in color and is lighter in color than those obtained when the acidic catalyst is removed by means of an anion exchange resin. I am at a loss to account for this surprising result. It may be that these neutralizing agents act as decolorizers in some manner. The novel allylidene-pentaerythritol containing the catalyst-neutralization reaction product is stable and may be stored for long periods without the formation of undesirable reaction products.

The amount of choline or benzyl trimethyl ammonium hydroxide used to neutralize the catalyst is substantially the stoichiometric amount required to neutralize the amount of catalyst added as very little, if any, catalyst is destroyed during the reaction of pentaerythritol with acrolein. If desirable the neutralizing agent may be added in increments with repeated testing of the solution to determine the pH value. In this manner the pH value may be adjusted upwardly to a range of 6–7 and preferably to a value of about 6.5. The neutralized solution will have a pH value slightly below 7. An excess of neutralizing agent must not be added so as to raise the pH value above 7 as the acrolein will tend to polymerize under alkaline conditions.

The following examples illustrate the present invention. In these examples, as well as throughout this specification and accompanying claims, all percentages are by weight,

Example 1

The first stage reaction was carried out in a flask equipped with a reflux condenser, an agitator and means for flowing nitrogen into the flask to carry out the reaction out of contact with the air. A mixture of 2448 grams (18 moles) of pentaerythritol, 1680 grams (30 moles) of technical grade acrolein, 13.5 grams of p-toluene sulfonic acid monohydrate (catalyst) and 1.68 grams of hydroquinone was placed in the flask. The hydroquinone was added as a polymerization inhibitor to prevent homopolymerization of the acrolein. The mixture was gradually heated over a period of 10–12 minutes to 48° C. Heating was gradually continued and after 30 minutes the reflux temperature was 70° C. Thereafter the mixture was held at 79° C. for 90 minutes. The resulting aqueous solution had a viscosity at 25° C. of J on the Gardner-Holdt scale.

Seventeen grams of a 50% solution of choline and methanol were added to the aqueous reaction mixture with stirring to raise the pH of the solution to 6.5. The solution was filtered to remove a small amount of undissolved impurities. Thereafter the neutralized aqueous solution was heated at 40–50° C. under a reduced pressure of 120 mm. of mercury until about 600 ml. of distillate had been collected. Thereafter the solution was heated at 80° C. at an absolute pressure of 10–20 mm. of mercury for an hour to remove the remainder of the water. The water removed contained some unreacted acrolein. The dehydrated allylidene-pentaerythritol weighed 3352 grams and had a hydroxyl content of 9.0%, an iodine number of 117 and a molecular weight of 320. This neutralized allylidene-pentaerythritol product was found to be quite stable, and it could be stored indefinitely without polymerization or decomposition.

The stable allylidene-pentaerythritol was mixed with 0.3% p-toluene sulfonic acid and was then cured at 75° C. The cured product was a clear, hard resin of very light color having the following characteristics:

| | |
|---|---|
| Tensile strength (D–651*) p. s. i | 10,220 |
| Compressive strength (D–695*) p. s. i | 13,450 |
| Flexural strength (D–790*) p. s. i | 15,300 |
| Impact strength (D–256*) ft. lb./in | 0.53 |
| Rockwell hardness (D–785*) | L–110 |
| Heat distortion temp. (D–648*) ° F | 176 |
| Dielectric strength (D–149*) volts/mil | 669 |

* The number in parenthesis refers to the test method of the "American Society for Testing Materials" that was used. For a description of these test methods, see "A. S. T. M. Standards," 1949, part 6 (Electrical Insulation, Plastic, Rubber).

Having described a preferred embodiment of my invention, it is to be understood that various modifications may be made in the invention. For example, plasticizers or modifiers for the resin may be incorporated with the prepolymer either before or after dehydration. While the choline is preferably added to the aqueous prepolymer, either with or without additional water, the choline could be added after all or part of the water has been removed as the reaction product is soluble in the prepolymer. Of course a mixture of choline and benzyl trimethyl ammonium hydroxide may be used instead of either compound alone.

I claim:

1. In the production of stable allylidenepentaerythritol wherein pentaerythritol is reacted with 1–2 moles of acrolein per mole of pentaerythritol in the presence of an acidic condensation catalyst selected from the group consisting of p-toluenesulfonic acid, oxalic acid, boron trifluoride, and phosphorous acid to produce allylidene-pentaerythritol, the improvement comprising treating the allylidene-pentaerythritol containing the acidic condensation catalyst with a compound selected from the group consisting of choline, benzyl trimethyl ammonium hydroxide and mixtures thereof, thereby neutralizing the acidic condensation catalyst.

2. In the production of stable allylidene-pentaerythritol wherein pentaerythritol is reacted with 1–2 moles of acrolein per mole of pentaerythritol in the presence of an acidic condensation catalyst selected from the group consisting of p-toluenesulfonic acid, oxalic acid, boron trifluoride, and phosphorous acid to produce allylidene-pentaerythritol, the improvement comprising treating the allylidene-pentaerythritol containing the condensation catalyst with choline, thereby neutralizing the acidic condensation catalyst.

3. In the production of stable allylidene-pentaerythritol wherein pentaerythritol is reacted with 1–2 moles of acrolein per mole of pentaerythritol in the presence of p-toluene sulfonic acid to produce allylidene-pentaerythritol, the improvement comprising treating the allylidene-pentaerythritol containing p-toluene sulfonic acid with choline, thereby neutralizing the acidic catalyst.

4. In the production of stable allylidene-pentaerythritol wherein pentaerythritol is reacted with 1–2 moles of acrolein per mole of pentaerythritol in the presence of an acidic condensation catalyst selected from the group consisting of p-toluenesulfonic acid, oxalic acid, boron trifluoride, and phosphorus acid to produce an acidic, aqueous solution of allylidene-pentaerythritol containing the acidic condensation catalyst, the improvement comprising adding to such a solution a compound selected from the group consisting of choline, benzyl trimethyl ammonium hydroxide and mixtures thereof, thereby neutralizing the acidic condensation catalyst and adjusting the pH of such solution upwardly to a value in the range of 6–7.

5. A stable, neutral product resulting from the reaction of pentaerythritol and 1–2 moles of acrolein per mole of pentaerythritol in the presence of an acidic condensation catalyst selected from the group consisting of p-toluenesulfonic acid, oxalic acid, boron trifluoride, and phosphorous acid, and the subsequent neutralization of the acidic condensation catalyst with a neutralizing compound selected from the group consisting of choline, benzyl trimethyl ammonium hydroxide, and mixtures thereof to produce a mixture of pentaerythritol-acrolein condensation product and the reaction product of the acidic condensation catalyst with the neutralizing compound.

6. A stable, neutral product resulting from the condensation of pentaerythritol and 1–2 moles of acrolein per mole of pentaerythritol in the presence of an acidic condensation catalyst selected from the group consisting of p-toluenesulfonic acid, oxalic acid, boron trifluoride, and phosphorous acid, and the subsequent neutralization of the acidic condensation catalyst with choline, to produce a mixture of pentaerythritol-acrolein condensation product and the reaction product of the acidic condensation catalyst with the choline.

7. A stable, neutral product resulting from the condensation of pentaerythritol and 1–2 moles of acrolein per mole of pentaerythritol in the presence of p-toluenesulfonic acid, and the subsequent neutralization of the p-toluenesulfonic acid with choline to produce a mixture of pentaerythritol-acrolein condensation product and the reaction product of the p-toluenesulfonic acid with the choline.

References Cited in the file of this patent

FOREIGN PATENTS 870,032    Germany _____ Mar. 9, 1953

OTHER REFERENCES

Gortner: Outlines of Biochemistry, published by John Wiley & Sons, Inc., New York, pages 493, 494.